US012795716B2

(12) United States Patent
Silverman et al.

(10) Patent No.: US 12,795,716 B2
(45) Date of Patent: Nov. 10, 2026

(54) PREEMPTION USING FULL DUPLEX IN WIRELESS FIDELITY NETWORK

(71) Applicant: Cisco Technology, Inc., San Jose, CA (US)

(72) Inventors: Matthew A. Silverman, Shaker Heights, OH (US); Brian D. Hart, Sunnyvale, CA (US); Malcolm M. Smith, Richardson, TX (US)

(73) Assignee: Cisco Technology, Inc., San Jose, CA (US)

( * ) Notice: Subject to any disclaimer, the term of this patent is extended or adjusted under 35 U.S.C. 154(b) by 545 days.

(21) Appl. No.: 18/295,190

(22) Filed: Apr. 3, 2023

(65) Prior Publication Data

US 2024/0260077 A1 Aug. 1, 2024

Related U.S. Application Data

(60) Provisional application No. 63/482,740, filed on Feb. 1, 2023.

(51) Int. Cl.
*H04W 36/22* (2009.01)
*H04L 5/14* (2006.01)
(Continued)

(52) U.S. Cl.
CPC ............. *H04W 72/569* (2023.01); *H04L 5/14* (2013.01); *H04W 28/26* (2013.01); *H04W 84/12* (2013.01)

(58) Field of Classification Search
CPC ..... H04W 88/06; H04W 84/12; H04W 76/15; H04W 16/14; H04W 36/00698;
(Continued)

(56) References Cited

U.S. PATENT DOCUMENTS

2008/0144493 A1* 6/2008 Yeh ........................ H04W 52/50 370/230
2015/0109977 A1* 4/2015 Loh ........................ H04L 5/0023 370/330
(Continued)

FOREIGN PATENT DOCUMENTS

CN 112436930 A 3/2021
WO 2021042317 A1 3/2021
WO 2021158480 A1 8/2021

OTHER PUBLICATIONS

International Search Report and Written Opinion for International Application No. PCT/US2024/012843, mailed Jun. 11, 2024, 17 Pages.
(Continued)

*Primary Examiner* — Quan M Hua
(74) *Attorney, Agent, or Firm* — Patterson + Sheridan, LLP

(57) ABSTRACT

The present disclosure describes preemption techniques in wireless fidelity (WiFi) networks using full duplex. An apparatus includes a first radio, a second radio, a third radio, a memory, and a processor communicatively coupled to the memory. The processor, while transmitting first messages using the first radio, receives a first frame from a device using the second radio and in response to receiving the first frame, preemptively terminates transmitting the first messages using the first radio. The processor, after terminating transmitting the first messages using the first radio, receives second messages from the device using the third radio.

6 Claims, 8 Drawing Sheets

(51) Int. Cl.

*H04W 28/26* (2009.01)
*H04W 72/566* (2023.01)
*H04W 84/12* (2009.01)

(58) Field of Classification Search

CPC ..... H04W 24/10; H04W 72/23; H04W 36/38; H04W 48/16; H04W 72/04; H04W 72/20; H04W 88/10; H04W 36/0061; H04W 36/22; H04W 40/248; H04W 52/0216; H04W 52/0229; H04W 72/21; H04W 92/10; H04W 92/20; H04W 92/02; H04W 48/06; H04W 36/0066; H04W 36/0009

See application file for complete search history.

(56) References Cited

U.S. PATENT DOCUMENTS

| | | | | |
|---|---|---|---|---|
| 2016/0226653 | A1* | 8/2016 | Bharadia | H04B 1/525 |
| 2019/0007941 | A1* | 1/2019 | Cavalcanti | H04B 7/2656 |
| 2020/0281008 | A1 | 9/2020 | Aboul-Magd et al. | |
| 2021/0144684 | A1* | 5/2021 | Yang | H04L 1/1854 |
| 2021/0227532 | A1 | 7/2021 | Zhou et al. | |
| 2022/0263635 | A1 | 8/2022 | Li et al. | |
| 2023/0379793 | A1* | 11/2023 | Xu | H04W 92/12 |

OTHER PUBLICATIONS

Ryu (NXP) K., et al., "Low Latency Support in UHR", IEEE Draft, 11-23-0018-00-0UHR-Low-Latenct-Support-In-UHR, IEEE-SA Mentor, Piscataway, NJ USA, vol. 802.11 UHR, Jan. 19, 2023, pp. 1-11, XP068201093, doc.: IEEE 802.11-23/0018r0, Jan. 5, 2023, Retrieved from https://mentor.ieee.org/802.11/ dcn/23/11-23-0018-00-0uhr-low-latency-support-inuhr. pptx on Jan. 19, 2023, Slide 6, Slide 7.

Yang (Huawei) B.B., et al., "Further Improve Latency Performance in 11be", IEEE Draft, 11-21-0670-00-00BE-Further-Improve-Latency-Performance-IN11BE, IEEE-SA Mentor, Piscataway, NJ USA, vol. 802.11 EHT, No. 802.11be, Apr. 20, 2021, pp. 1-13, XP068179836, Doc.: IEEE 802.11-21/0670r0, Apr. 13, 2021, Retrieved from https://mentor.ieee.org/802.11/dcn/21/11-21-0670-00-00be-further-improve-latency-performance-in11be.pptx on Apr. 20, 2021, Slide 6, Slide 7.

Toni Adame, "Time-Sensitive Networking in IEEE 802.11be: On the Way to Low-latency WiFi 7," arXiv.org, Dated: Nov. 26, 2020, pp. 1-8.

* cited by examiner

PREEMPTION USING FULL DUPLEX IN WIRELESS FIDELITY NETWORK

CROSS-REFERENCE TO RELATED APPLICATIONS

This application claims benefit of U.S. provisional patent application Ser. No. 63/482,740 filed Feb. 1, 2023. The aforementioned related patent application is herein incorporated by reference in its entirety.

TECHNICAL FIELD

Embodiments presented in this disclosure generally relate to wireless fidelity (WiFi) networks. More specifically, embodiments disclosed herein relate to full duplex communication in WiFi networks.

BACKGROUND

WiFi networks may be deployed to allow wireless communication within the range of the WiFi networks. The WiFi networks may handle various types of traffic, including augmented reality/virtual reality traffic, traffic from sensors and alarms, and traffic from other wireless devices.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

Figure 1:
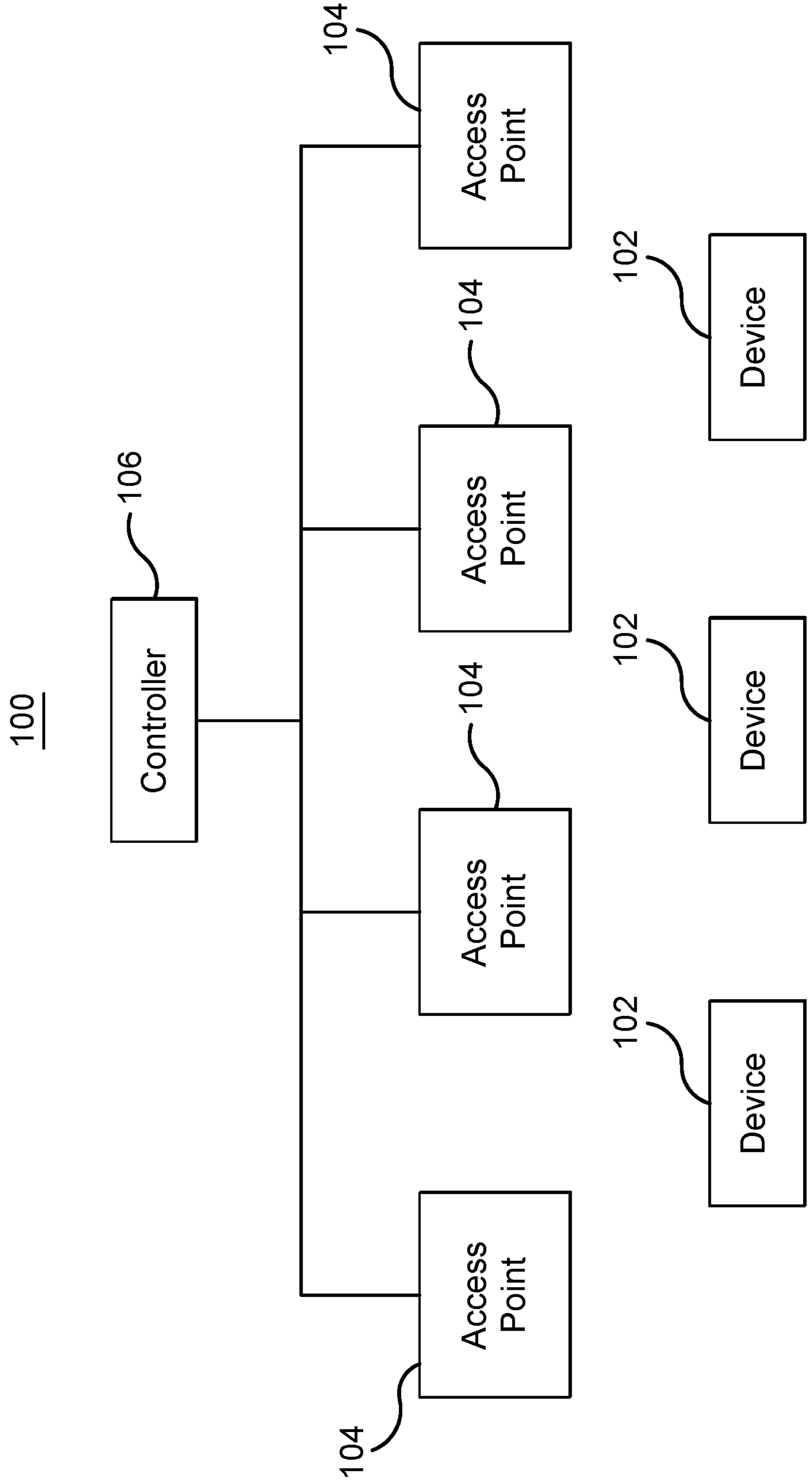
FIG. 1 illustrates an example system.

The present disclosure describes preemption techniques in wireless fidelity (WiFi) networks using full duplex. According to an embodiment, an apparatus includes a first radio, a second radio, a third radio, a memory, and a processor communicatively coupled to the memory. The processor, while transmitting first messages in a WiFi network using the first radio, receives a first frame from a device using the second radio and in response to receiving the first frame, preemptively terminates transmitting the first messages using the first radio. The processor, after terminating transmitting the first messages using the first radio, receives second messages from the device using the third radio.

According to another embodiment, an apparatus includes a memory and a processor communicatively coupled to the memory. The processor determines that a first message in a WiFi network should preempt other messages in the WiFi network and in response to determining that a transmission medium is free and in response to determining that the first message should preempt other messages, transmits, in one resource unit, an interrupt or the first message.

According to another embodiment, an apparatus includes a memory and a processor communicatively coupled to the memory. The processor determines that a first message in a WiFi network should preempt other messages in the WiFi network and while transmitting a second message, transmits an interrupt. The processor transmits the first message after transmitting the interrupt.

Example Embodiments

WiFi networks may be deployed to allow wireless communication within the range of the WiFi networks. Certain traffic flows may place particular timing or quality of service requirements on a WiFi network. For example, for augmented reality/virtual reality (AR/VR) and interrupt events (e.g., alarms tripping due to an imminent collision or a safety event), it may be important or vital for network traffic to be delivered with low latency and high reliability. Existing WiFi networks, however, may not provide the ability to allow such traffic to preempt other traffic. For example, the WiFi networks may operate by letting transmitters take turns transmitting, which may delay certain traffic. Additionally, certain user devices may transmit out of turn, which further delays the traffic.

The present disclosure describes a WiFi network that uses a version of full duplex communication to allow certain traffic flows to preempt other traffic flows. To implement full duplex, a WiFi access point in the network may transmit and receive messages at the same time. The access point may use a limited version of full duplex in which the full duplex capability is used only for preemption purposes. For example, during uplink preemption, the access point may use one receive path (e.g., one or more bands on one receive radio) to receive a preemption frame or interrupt from another device. The device may transmit the preemption frame or interrupt when the device detects that the access point is transmitting or that the uplink medium is free. The access point may then allow the device to transmit.

During downlink preemption, the access point may use one resource unit (e.g., a small frequency range) to transmit interrupts or high priority messages. When no interrupts or high priority messages need to be sent, the access point may send pad frames in the resource unit. Other devices on the network may listen on the resource unit to detect when the access point has transmitted an interrupt or high priority message.

Alternatively, when the access point has all spatial streams and resource units directed at one device, the access point may stop transmission of a message and insert an interrupt (which may be a code, symbol, or tone) to signal to the device that a high priority message is about to be transmitted. The access point may then transmit the high priority message.

In certain embodiments, the access point provides certain technical advantages. For example, the access point may allow for preemption to occur in a WiFi network. As another example, the access point may allow safety or vital messages to preempt other messages, which may improve safety and avoid dangerous events from occurring.

FIG. 1 illustrates an example system 100. As seen in FIG. 1, the system 100 includes one or more devices 102, one or more access points 104, and a controller 106. Generally, the system 100 may be a WiFi network or deployment. The devices 102 connect to one or more of the access points 104. The access points 104 provide network coverage for the system 100. The access points 104 communicate messages to the devices 102 and direct messages from the devices 102 towards their destination. The controller 106 may coordinate the operation of the access points 104. In certain embodiments, the access points 104 may implement a limited version of full duplex communication that allows for preemption of messages.

The device 102 may be any suitable device that wirelessly connects to one or more access points 104. As an example and not by way of limitation, the device 102 may be a computer, a laptop, a wireless or cellular telephone, an electronic notebook, a personal digital assistant, a tablet, or any other device capable of receiving, processing, storing, or communicating information with other components of the system 100. The device 102 may be a wearable device such as a virtual reality or augmented reality headset, a smart watch, or smart glasses. The device 102 may also include a user interface, such as a display, a microphone, keypad, or other appropriate terminal equipment usable by the user. The device 102 may include a hardware processor, memory, or circuitry configured to perform any of the functions or actions of the device 102 described herein. For example, a software application designed using software code may be stored in the memory and executed by the processor to perform the functions of the device 102.

The access point 104 facilitates wireless communication in the system 100. One or more devices 102 may connect to the access point 104. The access point 104 may then facilitate wireless communication for the connected devices 102. For example, the access point 104 may transmit messages to a connected device 102. As another example, the access point 104 may receive messages transmitted by the device 102. The access point 104 may then direct that message towards its intended destination.

The controller 106 may be a network controller that facilitates or manages the access points 104. In some embodiments, the controller 106 is integrated within one or more of the access points 104. For example, the controller 106 may determine when preemption is needed, and the controller 106 may coordinate the traffic flows in the system 100.

In certain embodiments, the access point 104 implement a limited version of full duplex communication to allow for preemption to occur in the system 100. During full duplex communication, the access point 104 may transmit and receive messages at the same time. The access point 104 may limit this simultaneous bidirectional communication for preemption purposes only. For example, the access point 104 may allow full duplex communication so that the access point 104 or the device 102 can signal that preemption is needed or about to occur. The access point 104 may use different techniques to signal or implement the preemption.

The access point 104 may receive uplink preemption traffic from the devices 102. During uplink preemption, a device 102 may signal to an access point 104 that the device 102 has traffic awaiting transmission that needs to preempt other traffic in the system 100. The device 102 may signal that preemption is needed by communicating a frame to the access point 104. The frame may include information that signals that preemption is needed. The access point 104 may use or reserve a limited number of receive paths for the purposes of receiving frames from the device 102. For example, the access point 104 may use or reserve a single receive path per band to receive the frame from the device 102. As another example, the access point 104 may use or reserve a single receive path on a single band to receive the frame from the device 102. As a result, only preemption traffic, such as the frames from the device 102, is allowed to be communicated over the receive paths used or reserved by the access point 104.

The access point 104 may advertise its full duplex preemption capability to the devices 102. In the advertisement, the access point 104 may indicate to the device 102 the receive paths to use to communicate the frames signaling preemption. When the device 102 needs to transmit a message that should be preempt other messages, the device 102 may transmit the frame over the receive paths designated by the access point 104. In certain embodiments, the device 102 may wait to transmit the frame. For example, the device 102 may wait until the medium is idle or until the access point 104 is transmitting. If the access point 104 is transmitting a message when the access point 104 receives the frame from the device 102, the access point 104 may preemptively terminate transmitting the message (e.g., before the message is finished transmitting). The access point 104 may then signal to the device 102 that the access point 104 is ready to receive the message from the device 102. The device 102 may then transmit the message to the access point 104, thereby preempting the message that was originally being transmitted by the access point 104.

For downlink preemption, the access point 104 may use different techniques to signal an interrupt or preemption to the devices 102. For example, in an orthogonal frequency division multiple access (OFDMA) system, the access point 104 may use or reserve one resource unit to broadcast interrupts to the devices 102. The resource unit may be a small frequency range that the access point 104 reserves to signal interrupts to the devices 102. When the access point 104 determines that there is a high priority message awaiting transmission at the access point 104, the access point 104 may broadcast the interrupt to the devices 102 using the resource unit (e.g., even if the access point 104 is receiving messages from the device 102). The access point 104 may then transmit the high priority message.

In certain embodiments, when the access point 104 is not using the resource unit to transmit an interrupt, the access point 104 may transmit pad frames in the resource unit. The devices 102 may ignore or discard the pad frames received over the resource unit. When the access point 104 determines that an interrupt should be sent, the access point 104 may transmit the interrupt using the resource unit. The devices 102 may detect the interrupt in the resource unit and determine that the access point 104 is about to transmit a high priority message.

As another example, in a multi-user, multiple input, multiple-output (MU-MIMO) system, the access point 104 uses spatial streams to service the devices 102. The access point 104 may direct spatial streams towards the devices 102 to allow the devices 102 to communicate simultaneously with the access point 104. The access point 104 may use or reserve one of the spatial streams for signaling interrupts or preemption to the devices 102. For example, when the access point 104 has a high priority message awaiting transmission, the access point 104 may communicate an interrupt using the spatial stream (e.g., even if the access point 104 is receiving messages from the devices 102). The devices 102 may detect the interrupt in the spatial stream and determine that the access point 104 is about to transmit a high priority message.

As another example, if the access point 104 has all spatial streams and resource units directed to a single device 102, then the access point 104 may insert an interrupt when the access point 104 determines that a high priority message should be transmitted. For example, if the access point 104 is transmitting a message to the device 102, the access point 104 may cut the transmission and insert the interrupt. The interrupt may include a code, a symbol, or a tone that the device 102 recognizes as the interrupt. When the device 102 detects the interrupt from the access point 104, the device 102 may understand that the access point 104 is terminating transmission of a message, and that the access point 104 will soon begin transmitting a new, high priority message. In some embodiments, after the access point 104 has completed transmitting the high priority message, the access point 104 may return to transmit the message that was cut. The access point 104 may retransmit the message, or the access point 104 may continue transmitting the message from where the message was cut.

Figure 2:
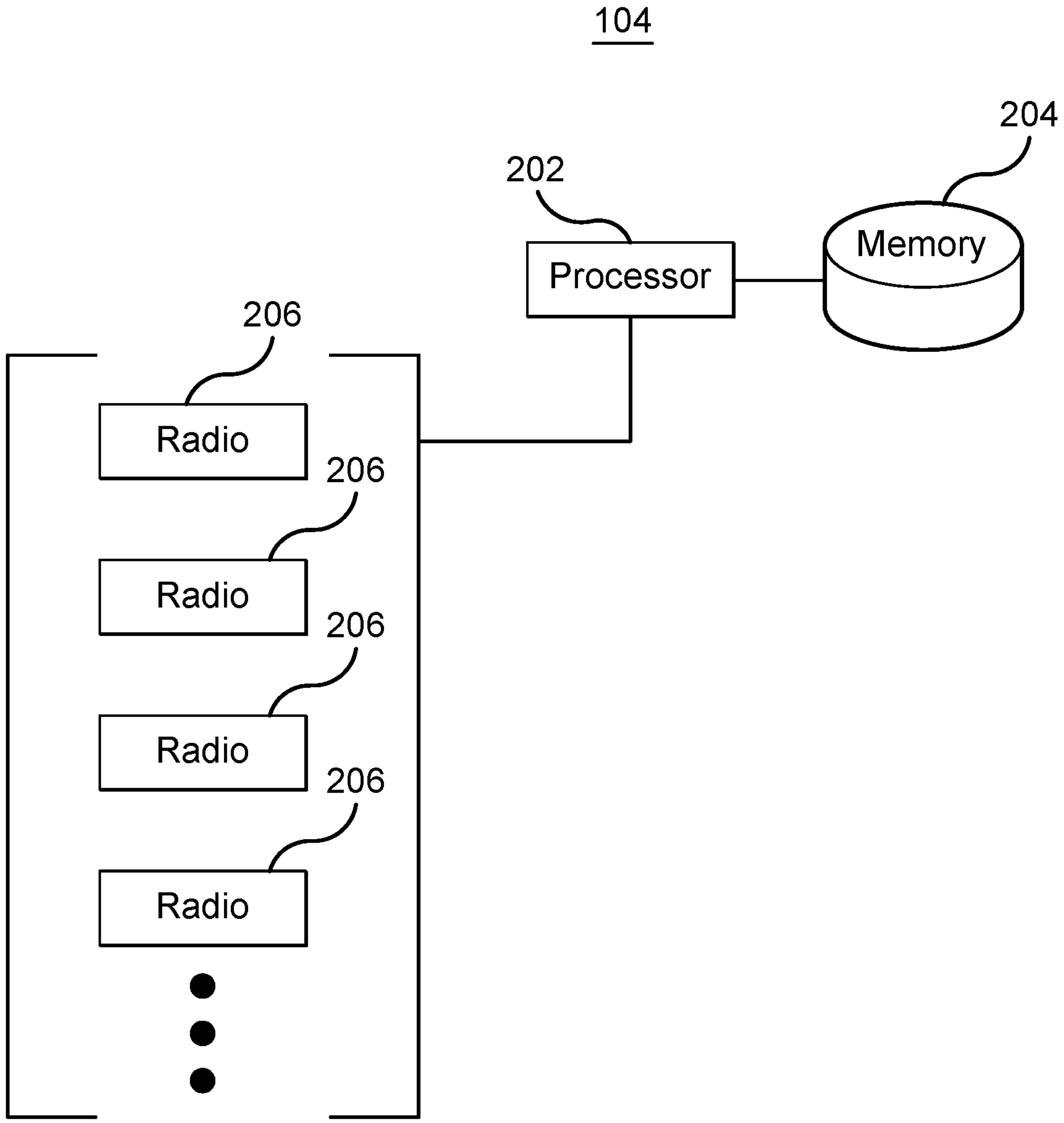
FIG. 2 illustrates an example access point in the system of FIG. 1.

FIG. 2 illustrates an example access point 104 in the system 100 of FIG. 1. As seen in FIG. 2, the access point 104 includes a processor 202, a memory 204, and radios 206. Generally, the processor 202, memory 204, and radios 206 perform the actions for functions of the access point 104 described herein.

The processor 202 is any electronic circuitry, including, but not limited to one or a combination of microprocessors, microcontrollers, application specific integrated circuits (ASIC), application specific instruction set processor (ASIP), and/or state machines, that communicatively couples to memory 204 and controls the operation of the access point 104. The processor 202 may be 8-bit, 16-bit, 32-bit, 64-bit or of any other suitable architecture. The processor 202 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The processor 202 may include other hardware that operates software to control and process information. The processor 202 executes software stored on the memory 204 to perform any of the functions described herein. The processor 202 controls the operation and administration of the access point 104 by processing information (e.g., information received from the devices 102, controller 106, and memory 204). The processor 202 is not limited to a single processing device and may encompass multiple processing devices.

The memory 204 may store, either permanently or temporarily, data, operational software, or other information for the processor 202. The memory 204 may include any one or a combination of volatile or non-volatile local or remote devices suitable for storing information. For example, the memory 204 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in the memory 204, a disk, a CD, or a flash drive. In particular embodiments, the software may include an application executable by the processor 202 to perform one or more of the functions described herein.

The access point 104 may include any suitable number of radios 206. In the example of FIG. 2, the access point 104 includes at least four radios 206. The access point 104 may use the radios 206 to transmit and receive messages from the devices 102 in the system 100. In some embodiments, the access point 104 uses the radios 206 to implement a limited version of full duplex communication. For example, the access point 104 may use some of the radios 206 to transmit messages, while the access point 104 uses one or more other radios 206 to receive messages. The access point 104 may limit the full duplex communication to the transmission or receipt of messages signaling preemption (e.g., preemption frames or interrupts) or high priority messages.

In some embodiments, the access point may include four receive radios 206 and four transmit radios 206 (which may be referred to as a 4×4 access point). Each radio 206 may communicate using three bands (which may be referred to as a triband system).

Figure 3:
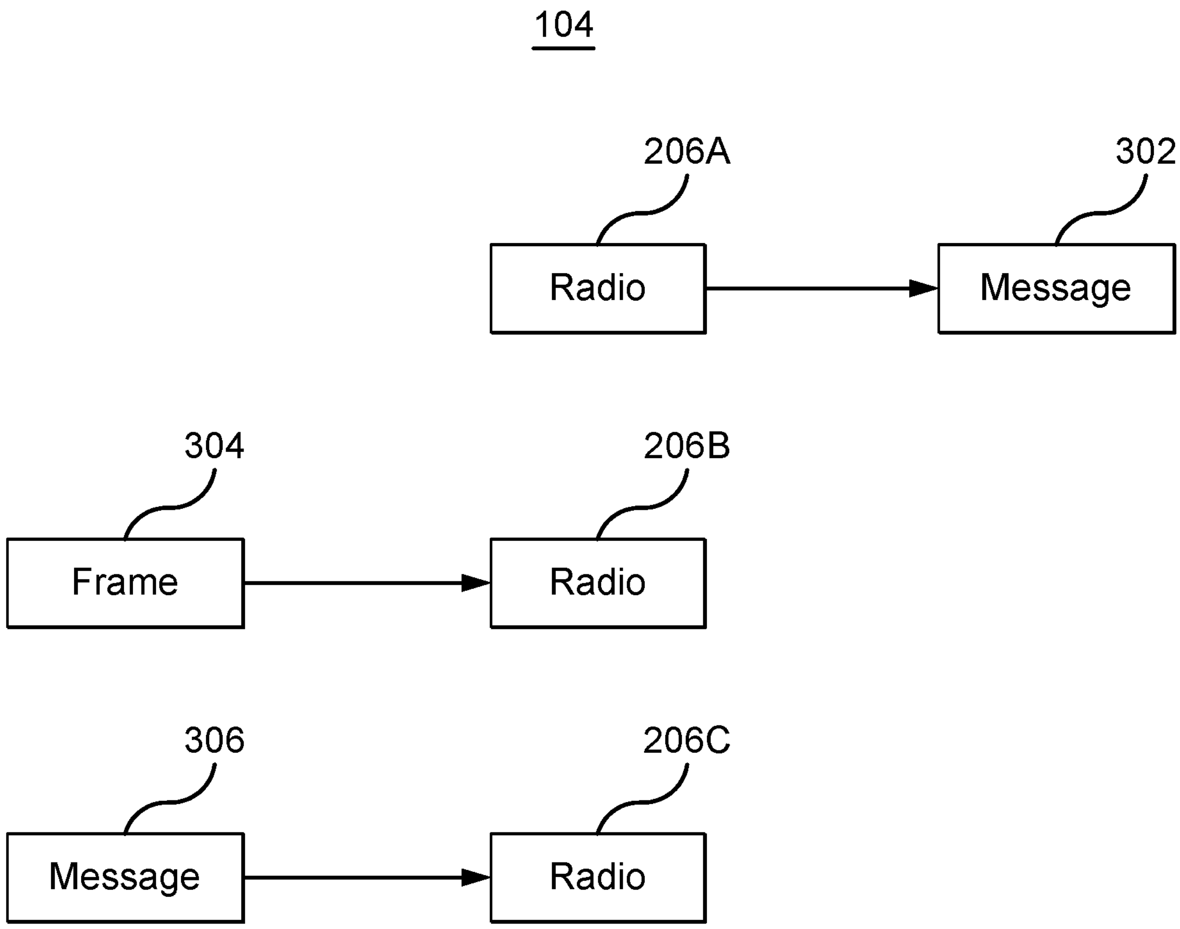
FIG. 3 illustrates an example access point in the system of FIG. 1 handling uplink preemption traffic.

FIG. 3 illustrates an example access point 104 in the system 100 of FIG. 1. Generally, FIG. 3 shows the access point 104 handling uplink preemption traffic. During uplink preemption, the access point 104 may receive a preemption frame from a device 102 that has a high priority message for transmission. In some embodiments, the access point 104 may reserve one or more receive paths for receiving preemption frames from the device 102. The access point 104 may terminate a transmission and allow the device 102 to transmit the message when the access point 104 receives the frame.

As shown in FIG. 3, the access point 104 includes radios 206A, 206B, and 206C. The access point 104 may include additional radios 206 that are not illustrated. The access point 104 may be transmitting a message 302 using the radio 206A. The access point 104 may be transmitting the message 302 to any device 102 in the system 100. While the device 104 is transmitting the message 302, a device 102 in the system 100 may signal that the device 102 has a high priority message that should preempt other messages in the system 100. The device 102 may communicate a frame 304 to the access point 104. The access point 104 may receive the frame 304 using the radio 206B. The device 102 may wait to transmit the frame 304 to the access point 104 until the device 102 determines that the transmission medium is free or that the access point 104 is transmitting.

In some embodiments, the access point 104 may receive the frame 304 using a receive path implemented by the radio 206B. The access point 104 may reserve the receive path for the devices 102 to transmit frames 304. Thus, the reserved receive path is dedicated for the communication of the frames 304 from the devices 102. The access point 104 may reserve or use any number of receive paths to receive the frames 304. For example, the access point 104 may use one receive path per band to receive the frames 304. Thus, every radio 206 in the access point 104 that is being used to receive messages from the devices 102, may have a receive path that is used or reserved for receiving the frames 304. As another example, the access point 104 may use or reserve a single receive path on a single band for receiving frames 304. When a device 102 associates with the access point 104, the access point 104 may advertise or instruct the device 102 how to signal an interrupt. For example, the access point 104 may inform the device 102 which receive paths to use to transmit the frames 304. The device 102 may then use one or more of the receive paths to transmit the frames 304 when the device 102 has a high priority message awaiting transmission.

When the access point 104 receives the frame 304, the access point 104 may preemptively terminate transmission of the message 302 using the radio 206A (e.g., terminate transmission of the message 302 before the message 302 has finished transmitting). By terminating transmission of the message 302, the access point 104 may make itself available to receive the high priority message. After the access point 104 terminates transmission of the message 302, the device 102 may begin transmitting the high priority message. The access point 104 may then receive the message 306 using the radio 206C. The message 306 may include the high priority message from the device 102. In some embodiments, the device 104 may receive the message 306 using the radio 206B that received the frame 304. After the access point 104 receives the message 306, the access point 104 may begin transmitting the message 302 again (e.g., using the radio 206A). In this manner, the access point 104 allows high priority messages from the devices 102 to preempt other transmissions.

In certain embodiments, the access point 104 may receive a frame from the device 102 using the radio 206B when the radio 206A is not being used to transmit. This frame may be received using the same or different receive path that was used to receive the frame 304. The access point 104 may receive the frame 304 and refrain from transmitting messages using the radio 206A. The access point 104 may then receive a high priority message from the device 102 using the radio 206C.

Figure 4:
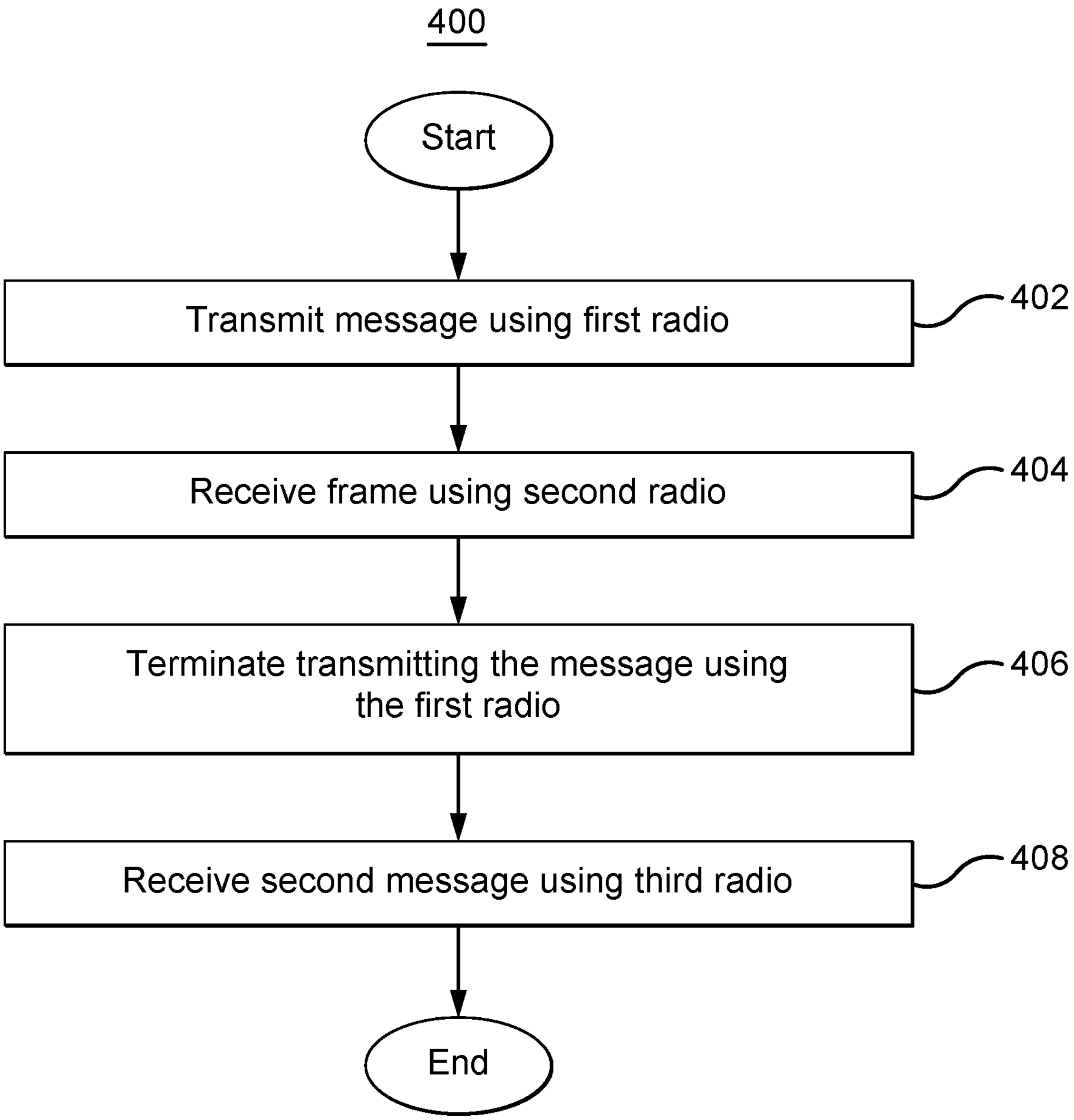
FIG. 4 is a flowchart of an example method performed in the system of FIG. 1.

FIG. 4 is a flowchart of an example method 400 performed in the system 100 of FIG. 1. In particular embodiments, the access point 104 performs the method 400. By performing the method 400, the access point 104 implements uplink preemption, which allows the devices 102 in the system 100 to transmit high priority messages that preempt other transmissions.

In block 402, the access point 104 transmits a message 302 using a first radio 206A. The access point 104 may transmit the message 302 to any device 102 in the system 100. In block 404, the access point 104 receives the frame 304 using a second radio 206B. The access point 104 may receive the frame 304 while the access point 104 is transmitting the message 302 using the radio 206A. The access point 104 may receive the frame 304 using a receive path of the second radio 206B. The access point 104 may have reserved the receive path for the reception of frames 304 from the devices 102. The frame 304 may signal to the access point 104 that the device 102 has a high priority message that should preempt other transmissions.

In block 406, the access point 104 terminates transmitting the message 302 using the first radio 206A. The access point 104 may preemptively terminate transmitting the message 302 in response to receiving the frame 304 from the device 102 (e.g., terminate transmitting the message 302 before the message 302 has finished transmitting), which frees the access point 104 to receive the high priority message. In block 408, the access point 104 receives a second message 306 using a third radio 206C. The second message 306 may be the high priority message that the device 102 needed to transmit. After the access point 104 terminates transmitting the message 302, the access point 104 may have signaled to the device 102 that the device 102 may transmit the second message 306. The device 102 may then start transmitting the second message 306. In some embodiments, the access point 104 may receive the second message 306 using the same radio 206B that received the frame 304.

Figure 5:
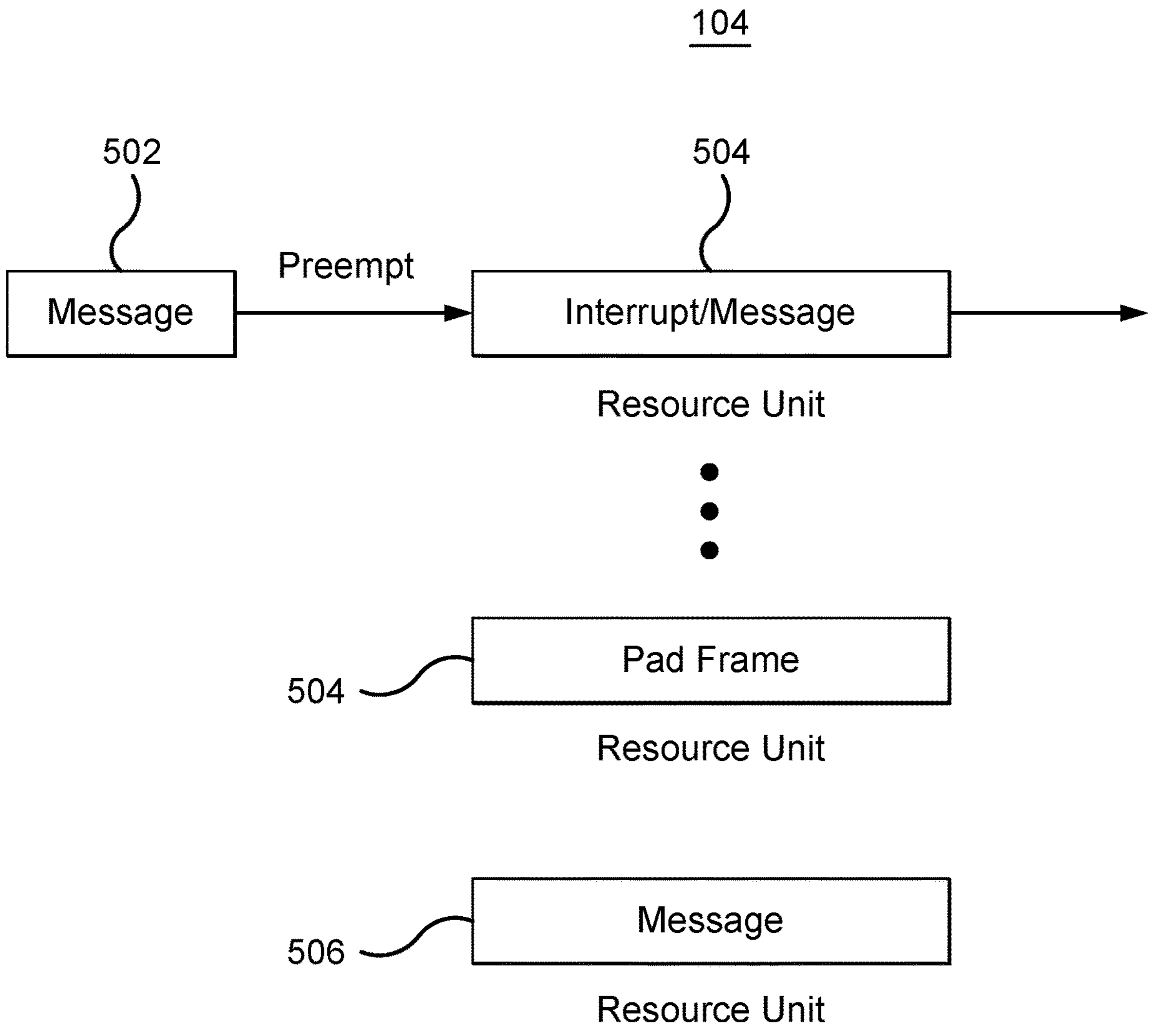
FIG. 5 illustrates an example access point in the system of FIG. 1 handling downlink preemption traffic.

FIG. 5 illustrates an example access point 104 in the system 100 of FIG. 1. Generally, FIG. 5 shows the access point 104 handling downlink preemption traffic. In particular embodiments, the access point 104 may use downlink preemption to signal to the devices 102 that the access point 104 has a high priority message awaiting transmission and that the high priority message should preempt other transmissions. The technique shown in FIG. 5 may be used in OFDMA systems.

The access point 104 may have a message 502 awaiting transmission. The access point 104 may determine that the message 502 is a high priority message that should preempt the transmission of other messages. For example, the access point 104 may determine that the message 502 is subject to certain quality of service requirements. As another example, the access point 104 may determine that the message 502 is being received from or transmitted to a device 102 that provides safety features.

When the access point 104 determines that the message 502 should preempt the transmission of other messages, the access point 104 may use a resource unit 504 to communicate an interrupt or the message 502. The resource unit 504 may be a small frequency range that the access point 104 uses to transmit interrupts or the message 502. In some embodiments, the resource unit 504 is contained in one spatial stream. The access point 104 may transmit the interrupt or the message 502 using a multi-user physical layer (MU PHY) format.

If the message 502 is short, the access point 104 may transmit the message 502 in the resource unit 504 without transmitting the interrupt. If the access point 104 does not transmit the message 502 in the resource unit 504, the access point 104 may transmit the interrupt in the resource unit 504. The access point 104 may broadcast the interrupt to the devices 102 in the system 100. The interrupt may signal to the devices 102 that the access point 104 needs to transmit the message 502. In some embodiments, when the access point 104 is transmitting the interrupt in the resource unit 504, the access point 104 may use other resource units (e.g., the resource unit 506) to transmit other messages.

In response to the interrupt, the devices 102 may terminate transmitting messages to the access point 104 so that the access point 104 may transmit the message 502. The access point 104 may then transmit the message 502. The access point 104 may use any suitable number of resource units to transmit the message 502. For example, the access point 104 may use one or more different resource units 506 to transmit the message 502 after the access point 104 transmits the interrupt using the resource unit 504.

The access point 104 may reserve the resource unit 504 for the transmission of interrupts or high priority messages. When the access point 104 is not using the resource unit 504 to transmit interrupts or messages, the access point 104 may transmit pad frames (e.g., null frames) in the resource unit 504. The devices 102 may listen over the resource unit 504. When the devices 102 receive the pad frames, the devices 102 may ignore or discard the pad frame. When the devices 102 receive the interrupt, the devices 102 may stop transmitting and listen for the high priority message.

In this manner, the access point 104 signals to the devices 102 that a high priority message is awaiting transmission at the access point 104. Additionally, the access point 104 may preempt the transmission of other messages using this downlink preemption technique.

In some embodiments, because the device 102 may have other traffic on other resource units, the device 102 may support reception of two simultaneous resource units. For example, the device 102 may have one fully featured resource unit receiver and another resource unit receiver that is limited to receiving the resource unit 504.

Figure 6:
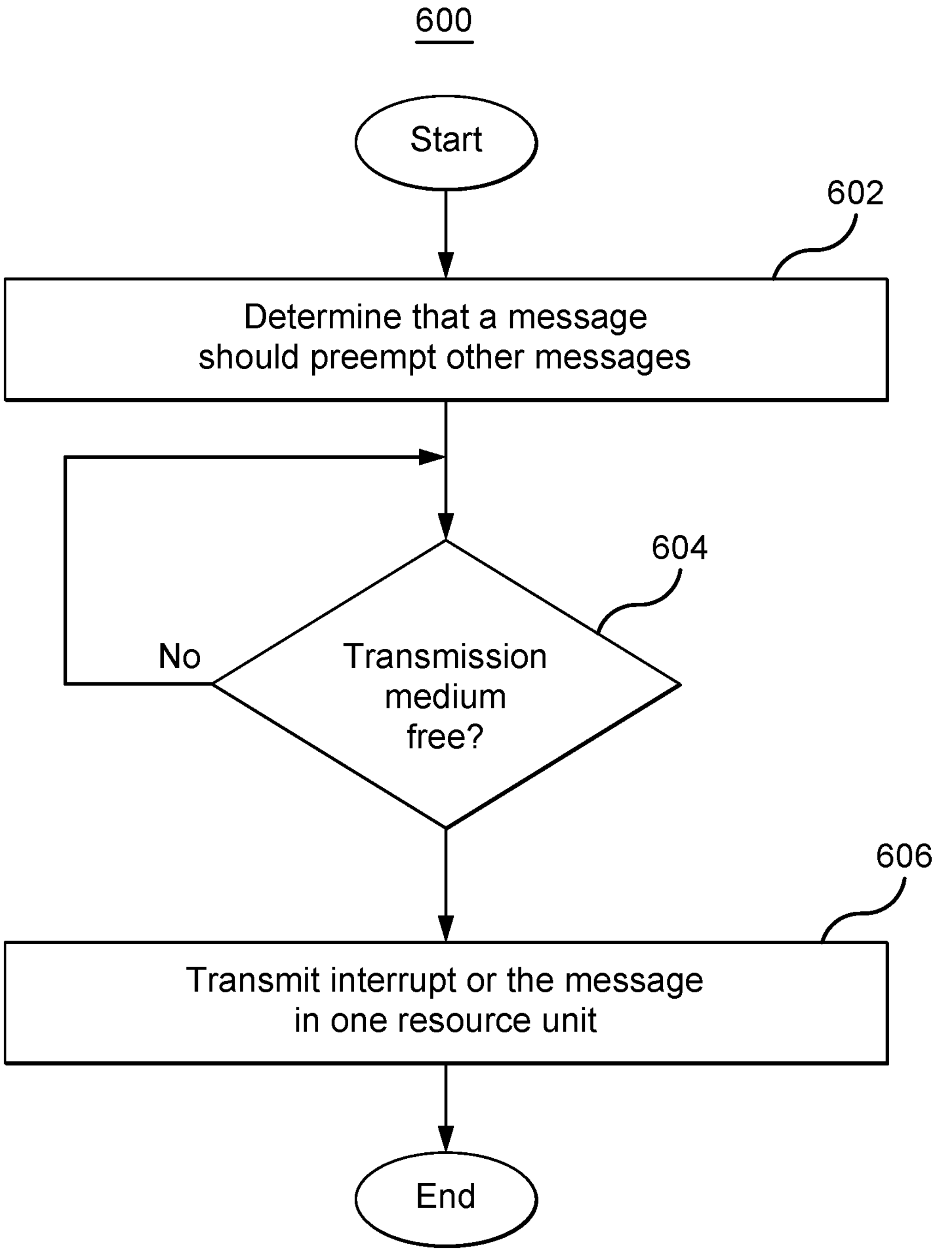
FIG. 6 is a flowchart of an example method performed in the system of FIG. 1.

FIG. 6 is a flowchart of an example method 600 performed in the system 100 of FIG. 1. In particular embodiments, the access point 104 performs the method 600. By performing the method 600, the access point 104 signals to the devices 102 in the system 100 that a high priority message is awaiting transmission at the access point 104.

In block 602, the access point 104 determines that a message 502 should preempt the transmission of other messages. For example, the message 502 may be a high priority message. The message 502 may be a message that is subject to certain quality of service requirements, or the message 502 may be generated by or for a device 102 that provides safety features.

The access point 104 may determine whether the transmission medium is free in block 604. If the transmission medium is not free, the access point 104 may wait until the transmission medium is free. After the transmission medium is free, the access point 104 transmits an interrupt or the message 502 in a resource unit 504. The resource unit 504 may be a small frequency range that the access point 104 uses or reserves for the transmission of interrupts or high priority messages. When the access point 104 transmits the interrupt, the devices 102 may receive the interrupt over the resource unit and terminate transmitting messages. Additionally, the access point 104 may stop transmitting a message so that the access point 104 can transmit the message 502 or the interrupt. The access point 104 may then transmit the message 502 using the resource unit 504 and/or other resource units 506. If the message 502 is short, then the access point 104 may transmit the message 502 in the resource unit 504 rather than transmitting the interrupt.

In certain embodiments, the access point 104 may transmit pad frames using the resource unit 504 when the access point 104 is not using the resource unit 504 to transmit interrupts or the message 502. The devices 102 may listen on the resource unit 504. When the devices 104 receive the pad frames, the devices 102 may ignore or discard the pad frames. When the devices 102 receive the interrupt or the message 502, the devices 102 may process the interrupt or the message 502.

Figure 7:
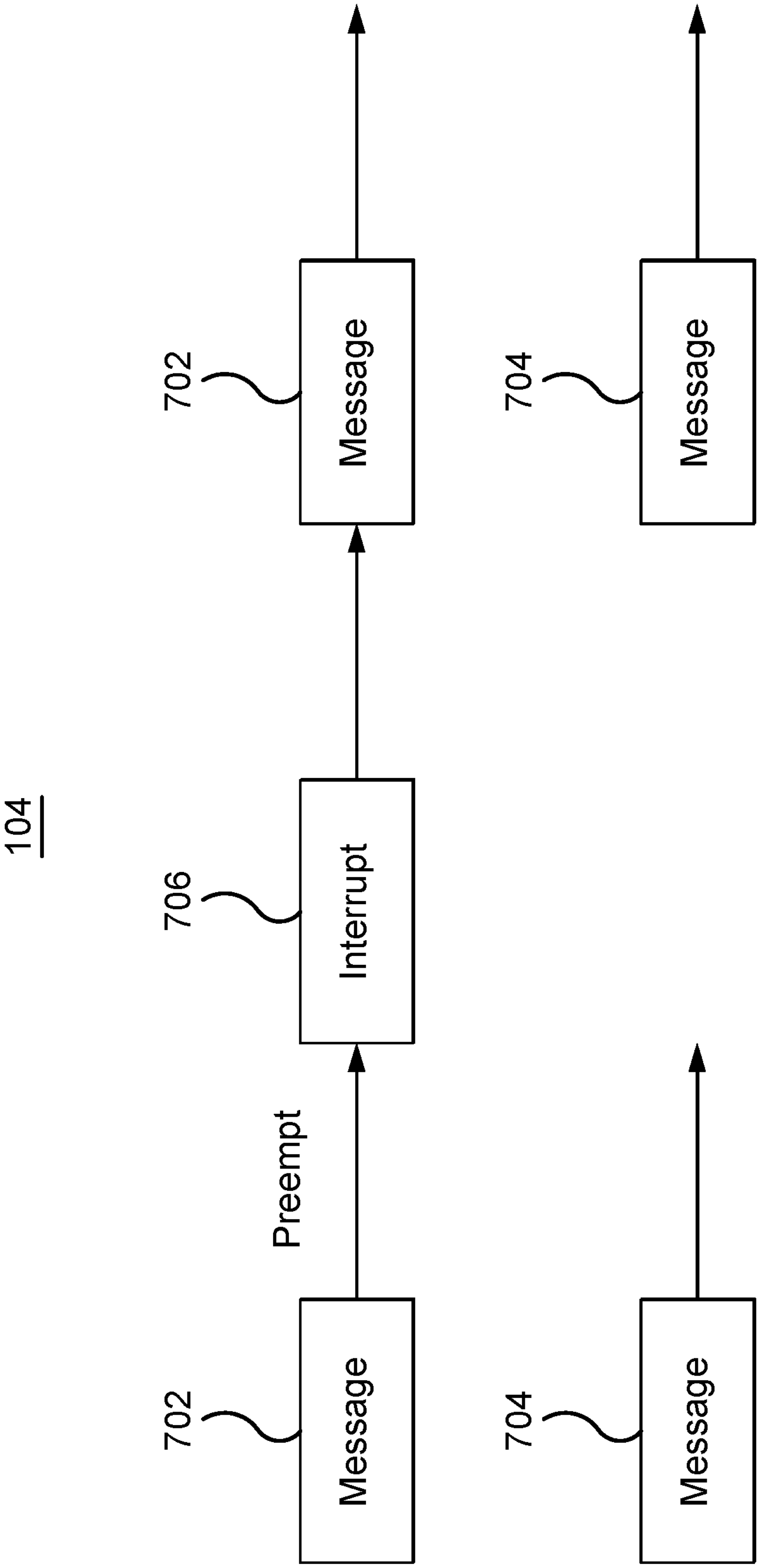
FIG. 7 illustrates an example access point in the system of FIG. 1 handling downlink preemption traffic.

FIG. 7 illustrates an example access point 104 in the system 100 of FIG. 1. Generally, FIG. 7 shows the access point 104 handling downlink preemption traffic. The technique shown in FIG. 7 may be used when the access point 104 has all spatial streams and resource units directed to a single device 102.

The access point 104 may determine that a message 702 is a high priority message that should preempt other messages. Additionally, the access point 104 may be transmitting a message 704 to the device 102. When the access point 104 determines that the message 702 should preempt other messages, the access point 104 may terminate transmission of the message 704 and transmit an interrupt 706 to the device 102. As a result, the access point 104 cuts the transmission of the message 704 and transmits the interrupt 706 to the device 102. The interrupt 706 may take the form of a code, a symbol, or a tone. For example, the tone may be a pilot tone with changed polarity or changed level, a guard tone with changed energy, or a data tone with changed energy (e.g., rho for odd tones and sqrt(2-rho)^2 for even tones). The device may recognize the code, symbol or tone as the interrupt 706. When the device 102 receives the interrupt 706, the device 102 understands that the access point 104 is stopping transmission of the message 704 to the device 102. The device 102 may also understand that the access point 104 is about to begin transmitting the high priority message 702. After transmitting the interrupt 706, the access point 104 begins transmitting the message 702. The access point 104 may transmit the message 702 to the device 102 or to another device 102 in the system 100.

After the access point 104 finishes transmitting the message 702, the access point 104 may transmit the message 704. In some embodiments, the access point 104 may restart the transmission of the message 704. Alternatively, the access point 104 may continue transmitting the message 704 from the point at which the message 704 was previously cut off.

Figure 8:
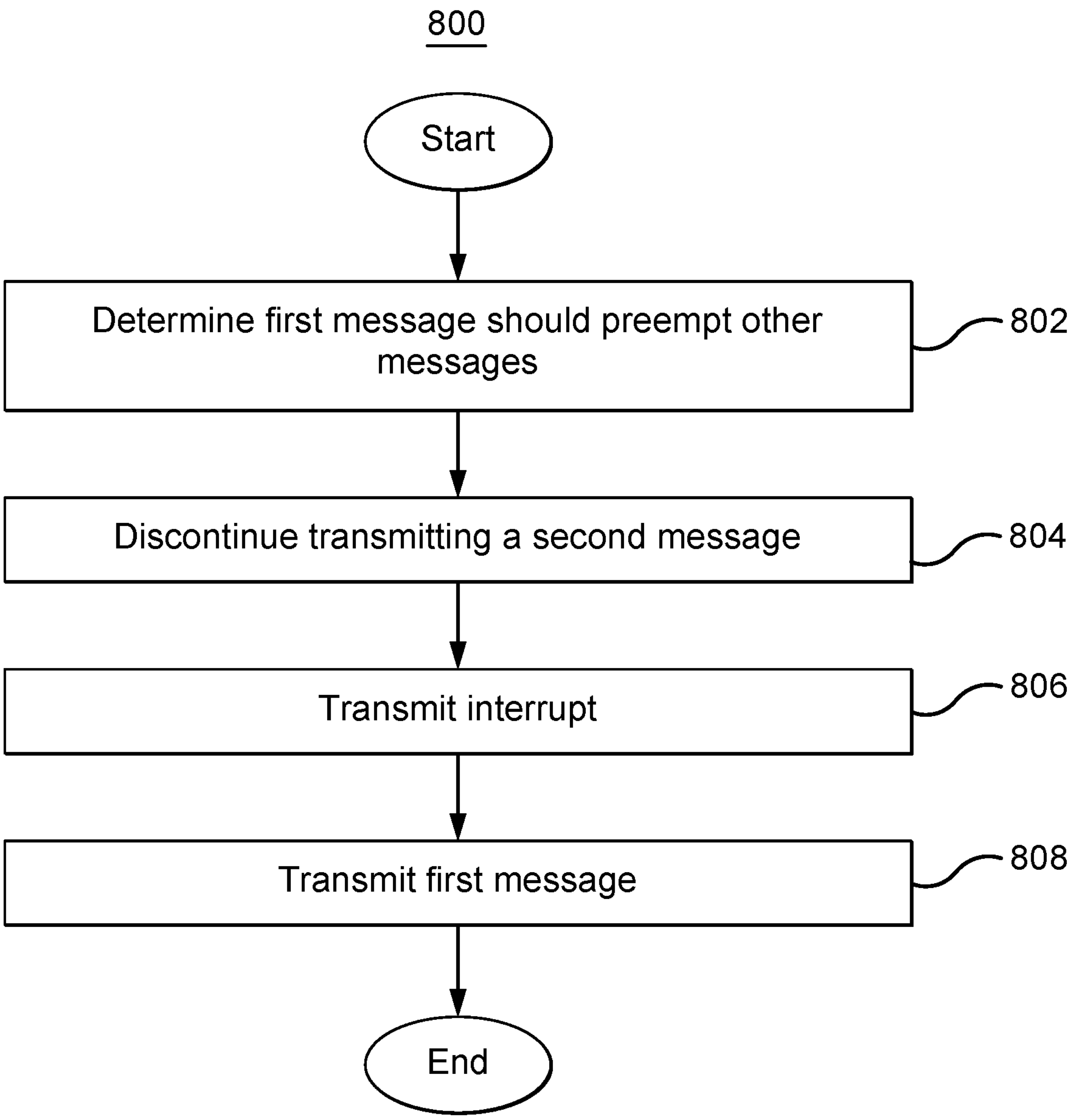
FIG. 8 is a flowchart of an example method performed in the system of FIG. 1.

FIG. 8 is a flowchart of an example method 800 performed in the system 100 of FIG. 1. In particular embodiments, the access point 104 performs the method 800. By performing the method 800, the access point 104 implements downlink preemption. The method 800 may be performed by the access point 104 when the access point 104 has all of its spatial streams and resource units directed at a single device 102.

In block 802, the access point 104 determines that a first message 702 should preempt other messages, such as a second message 704. The access point 104 may make this determination by determining that the first message 702 is subject to quality of service requirements or that the first message 702 is generated by or for a device 102 that implements safety features. In block 804, the access point 104 discontinues transmitting a second message 704 (e.g., cut off transmission of the second message 704). The access point 104 may discontinue transmitting the second message 704 in response to determining that the first message 702 is a high priority message. The access point 104 may discontinue transmitting the second message 704 so that the access point 104 may prepare to transmit the first message 702.

In block 806, the access point 104 transmits an interrupt 706. For example, the access point 104 may be in the middle of transmitting the message 704 when the access point 104 transmits the interrupt 706. Thus, the access point 104 may cut the transmission of the second message 704 in the middle, and transmit the interrupt 706. When the device 102 receives the interrupt 706, the device 102 may understand that the access point 104 has cut transmission of the second message 704. The device 102 may also understand that the access point 104 is about to begin transmitting the first message 702.

In block 808, the access point 104 transmits the first message 702. The device 102 may receive and process the first message 702. In some embodiments, after the access point 104 finishes transmitting the first message 702, the access point 104 transmits the second message 704. For example, the access point 104 may retransmit the second message 704 from the beginning. As another example, the access point 104 may continue transmitting the second message 704 from the point at which the second message 704 was originally cut off.

In summary, a WiFi network uses a version of full duplex communication to allow certain traffic flows to preempt other traffic flows. To implement full duplex, a WiFi access point 104 in the network may transmit and receive messages at the same time. The access point 104 may use a limited version of full duplex in which the full duplex capability is used only for preemption purposes. For example, during uplink preemption, the access point 104 may use one receive path (e.g., one or more bands on one receive radio) to receive a preemption frame or interrupt from another device 102. The device 102 may transmit the preemption frame or interrupt when the device 102 detects that the access point 104 is transmitting or that the uplink medium is free. The access point 104 may then allow the device 102 to transmit.

During downlink preemption, the access point 104 may use one resource unit (e.g., a small frequency range) to transmit interrupts or high priority messages. When no interrupts or high priority messages need to be sent, the access point 104 may send pad frames in the resource unit. Other devices 102 on the network may listen on the resource unit to detect when the access point 104 has transmitted an interrupt or high priority message.

Alternatively, when the access point 104 has all spatial streams and resource units directed at one device 102, the access point 104 may stop transmission of a message and insert an interrupt (which may be a code, symbol, or tone) to signal to the device 102 that a high priority message is about to be transmitted. The access point 104 may then transmit the high priority message.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," or "at least one of A or B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:

1. An apparatus comprising:

a first radio;

a second radio;

a third radio;

a memory; and a processor communicatively coupled to the memory, the processor configured to:

instruct a device to transmit a first frame signaling preemption to the second radio;

while transmitting first messages in a wireless fidelity (WiFi) network using the first radio, receive, from the device, the first frame at the second radio;

in response to receiving the first frame, preemptively terminate transmitting the first messages using the first radio;

after terminating transmitting the first messages using the first radio, instruct the device to send second messages; and receive the second messages from the device using the third radio.

2. The apparatus of claim 1, wherein the processor is further configured to:

while the first radio is free, receive a second frame signaling preemption from the device at the second radio;

in response to receiving the second frame, refrain from transmitting messages using the first radio; and while refraining from transmitting messages using the first radio, receive, from the device, third messages at the third radio.

3. The apparatus of claim 2, wherein the first frame and the second frame are received at the second radio using a first receive path of the second radio.

4. The apparatus of claim 2, wherein the second frame is received at the second radio using a second receive path of the second radio, and wherein the second receive path is different from the first receive path.

5. The apparatus of claim 1, wherein the processor is further configured to transmit third messages using the first radio after receiving, from the device, the second messages at the third radio.

6. The apparatus of claim 1, wherein the processor is further configured to reserve multiple receive paths of the second radio that can receive the first frame from the device.

* * * * *